United States Patent
Cole

[11] 3,892,213
[45] July 1, 1975

[54] QUICK HEAT MANIFOLD

[75] Inventor: Edward N. Cole, Bloomfield Hills, Mich.

[73] Assignee: General Motors Corporation, Detroit, Mich.

[22] Filed: Sept. 5, 1973

[21] Appl. No.: 394,459

[52] U.S. Cl. .................. 123/122 H; 123/122 AC
[51] Int. Cl. ........................................ F02m 31/00
[58] Field of Search ................ 123/122 AC, 122 H

[56] References Cited
UNITED STATES PATENTS

| | | | |
|---|---|---|---|
| 1,479,381 | 1/1924 | Good | 123/122 AC |
| 1,944,396 | 1/1934 | Berry | 123/122 H |
| 2,395,264 | 2/1946 | Gardner | 123/122 H |
| 3,780,715 | 12/1973 | Flitz | 123/122 AC |

Primary Examiner—Charles J. Myhre
Assistant Examiner—R. H. Lazarus
Attorney, Agent, or Firm—J. C. Evans

[57] ABSTRACT

A heated manifold for a V-8 engine includes an intake manifold having carburetor riser bores therein in communication with an induction passageway with spaced apart pairs of transverse runners for directing air-fuel mixture to intake valves in each bank of cylinders of the V-8 engine. An insert plate formed in the intake manifold below the riser bores is enclosed on one side by a manifold plate having a crossover passage therethrough with side inlets each in communication with one of the exhaust manifolds of the engine. Each of the exhaust manifolds include a separate exhaust pipe connected to a common tailpipe. The crossover passage has a center outlet to a third exhaust pipe that is connected to the tailpipe downstream of a spring biased, thermostatically controlled heat riser valve. During engine warm-up, the valve is closed and exhaust gases from both cylinder banks pass through the crossover passage and the third exhaust pipe to rapidly heat the intake manifold insert. After engine warm-up, the valve is opened and exhaust gases are routed from each exhaust manifold through the separate exhaust pipes and the common tailpipe in bypassed relationship to the insert to prevent excessive heat flow to the air-fuel intake mixture.

2 Claims, 3 Drawing Figures

QUICK HEAT MANIFOLD

This invention relates to engine manifolds and more particularly to quick heat intake manifolds for reducing engine emissions under cold start conditions.

Exhaust heated hot spots have been used in intake manifolds of engines for many years. Such systems utilize thermostatically controlled heat riser valves in the exhaust system to force additional exhaust heat to the hot spots while the engine is cold.

In the case of in-line four cylinder and in-line six cylinder engines, it is a straight forward proposition to direct exhaust from all of the cylinders against a thin plate, exhaust heated insert to rapidly increase the temperature thereof so that it will evaporate any liquid fuel accumulation thereon for a short period following engine start.

Eight cylinder engine manifolds have included a crossover passageway beneath a pair of induction passageways having exhaust heated insert plates at the base thereof. In a typical eight cylinder intake manifold, the induction passageways are formed on two separate levels and exhaust flow for heating the insert plates is limited to exhaust heat from four of the cylinders.

An object of the present invention is to improve the operation of an exhaust heated insert plate in an intake manifold for a V-8 engine by the provision of an approved exhaust system to selectively divert exhaust from all eight cylinders of the engine through a crossover passageway during cold start operation to produce rapid insert plate heat-up and to bypass exhaust heat from the insert following engine warm-up.

Still another object of the present invention is to reduce the time required to increase the temperature of an intake manifold insert having an exhaust crossover passageway on one side thereof and an induction passageway on the other side thereof by means of a single level induction passageway on one side of the heated insert and a single level exhaust passageway on the other side of the plate formed in part by an exhaust manifold crossover passage with a pair of inlets each connected to the exhaust manifold of one bank of a V-8 engine; each of the exhaust manifolds including a separate exhaust pipe connected through a thermostatically controlled heat riser valve to an outlet pipe; the crossover passageway having a central outlet therefrom in communication with a third exhaust pipe that is connected to the outlet pipe downstream of the valve to provide direct flow of exhaust gases from both banks of cylinders through the crossover passageway when the thermostatically controlled valve is closed during cold engine start; the valve including means responsive to full throttle operation to move into an open position to cause exhaust from the manifolds through the separate exhaust pipes connected thereto thereby to avoid excessive pressure buildup in the exhaust crossover passage during insert plate heat-up; the valve opening on engine warmup to direct exhaust from the separate exhaust pipes is bypassed relationship to the crossover passage.

Yet another object of the present invention is to improve a quick heat intake manifold for use in V-8 engines by the provision of an exhaust manifold having a crossover passageway therein between the two banks of cylinders in a V-8 engine; the crossover passage extending under a hot plate insert in the intake manifold; each manifold of the engine having a separate exhaust pipe connected to a common outlet pipe upstream of a thermostatically controlled valve which will block flow through the separate exhaust pipes at cold engine start; a third exhaust pipe is connected to a center outlet from the crossover passage and to the common outlet pipe downstream of the valve for providing a flow path to cause exhaust from all eight cylinders to heat the insert during cold start operation; the valve being responsive to full throttle conditions to direct exhaust flow from the manifolds through the separate exhaust pipes to avoid excessive pressure loss in the exhaust system under cold engine conditions; the valve responding to increased engine temperatures to communicate each of the separate exhaust pipes with the common outlet pipe thereby to reduce heat flow through the crossover passageway on engine warm-up.

Further objects and advantages of the present invention will be apparent from the following description, reference being had to the accompanying drawings wherein a perferred embodiment of the present invention is clearly shown.

Figure 1:
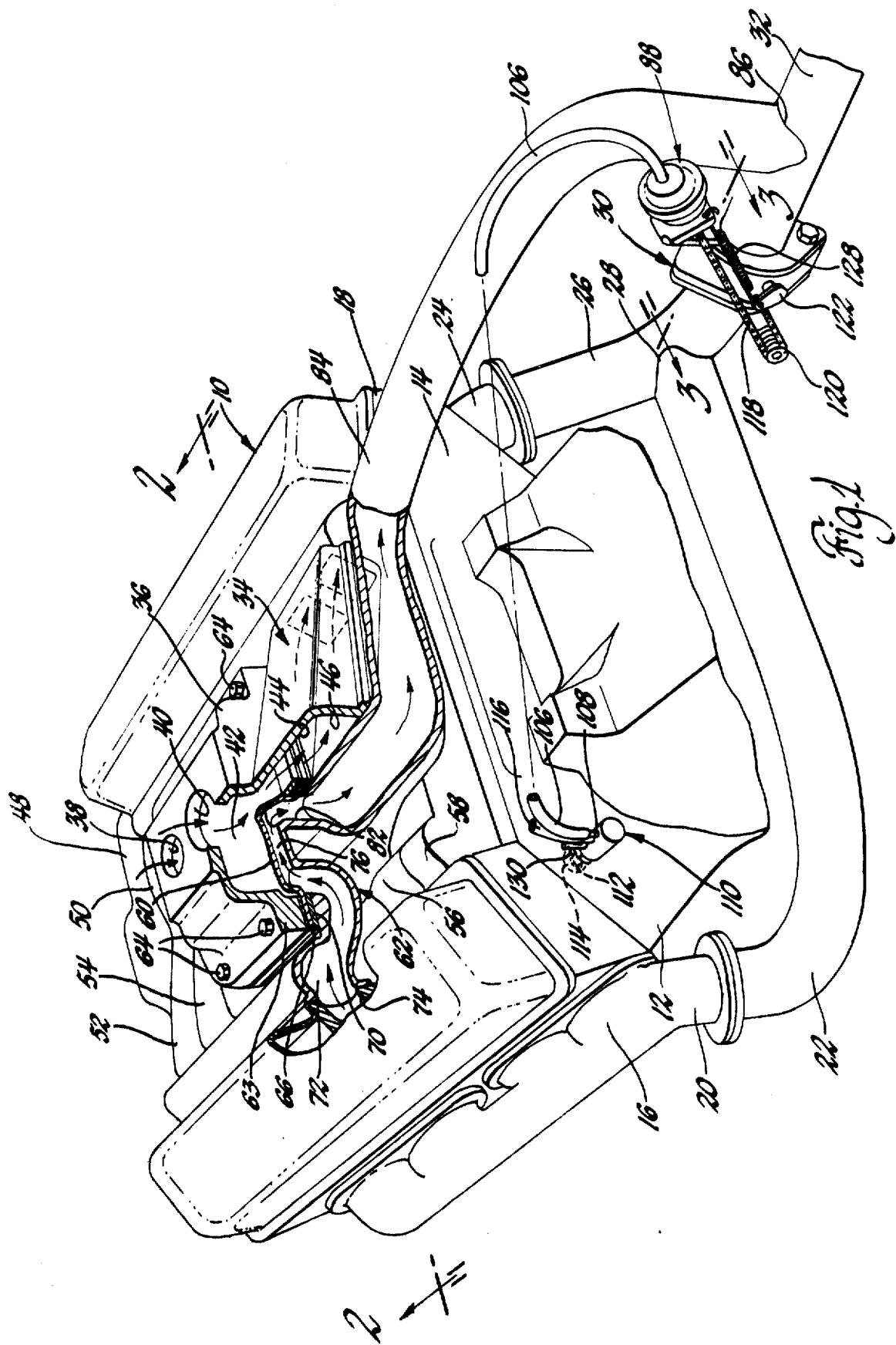
FIG. 1 is a view in perspective showing a three-exhaust pipe system for producing eight cylinder heat of an insert plate in a quick heat intake manifold for a V-8 engine.
Figure 2:
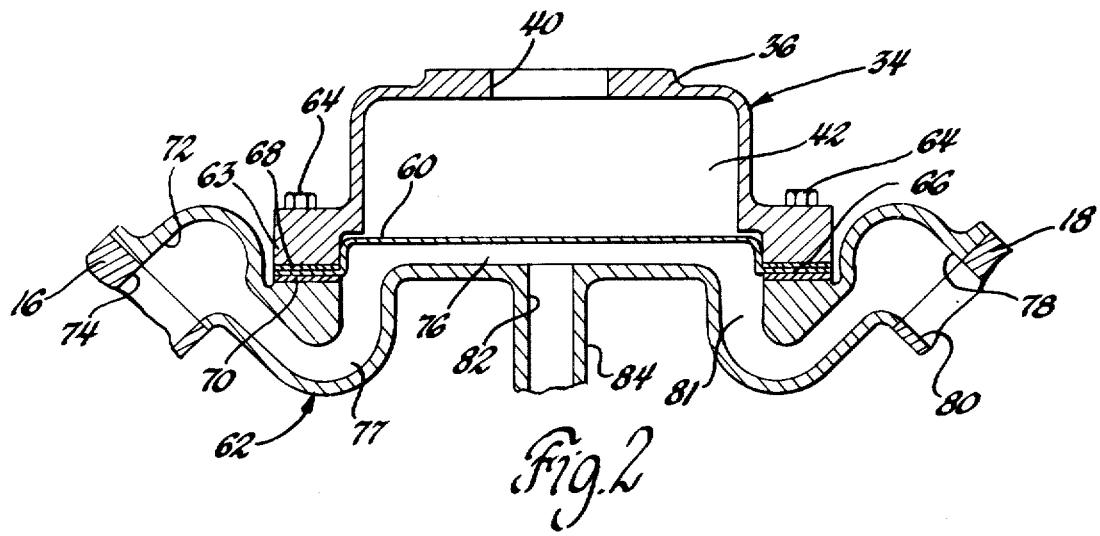
FIG. 2 is a vertical sectional view taken along the line 2—2 of FIG. 1.

Referring now to the drawing, FIG. 1 shows a V-8 engine 10 including a first bank of cylinders 12 and a second bank of cylinders 14. Each of the cylinder banks 12, 14 include an exhaust manifold 16, 18 respectively. The exhaust manifold 16 includes an outlet 20 connected to a Y-configured exhaust pipe including a first exhaust pipe branch 22 and the manifold 18 includes an outlet 24 thereon connected to a second exhaust pipe branch 26. Each of the exhaust pipes are joined at junction 28 upstream of a thermostatically controlled heat riser valve 30 that controls flow from the separate pipes 22, 26 through a common outlet pipe 32.

The present invention includes an improved quick heat intake manifold 34 including an upper casting 36 having carburetor riser bores 38, 40 therein which are connected to a carburetor for supplying an air-fuel intake mixture therethrough. The riser bores 38, 40 are in communication with a single level intake passage 42 which communicates with a first pair of transverse runners 44, 46 to direct induction flow to intake valves of a pair of cylinders in the bank of cylinders 14. A like pair of transverse runners 48, 50 direct induction flow to the other cylinders of the bank 14.

Likewise, the bank 12 is supplied by a pair of forward transverse runners 52, 54 on the opposite side of the intake manifold 34 and a pair of rear transverse runners 56, 58 in communication with the single level intake passage 42 and the intake valves of the rear cylinders of the bank 12.

The base of the single intake passage 42 includes a heat transfer insert plate 60 which is held in place by means of an exhaust crossover plate 62 connected to the base 63 of the intake manifold 34 by means of bolts 64.

The insert plate 60 has the periphery 66 thereof sealed with respect to the intake manifold 34 by means of a gasket 68 and with respect to the exhaust crossover plate by means of a gasket 70.

The exhaust crossover plate 62 includes an inlet 72 that communicates with an outlet 74 from the exhaust manifold 16 to direct exhaust flow from the exhaust valves of the engine bank 12 through a branch 77 of an exhaust heat crossover passage 76 which underlies the insert plate 60 in heat transfer relationship therewith. Likewise, the crossover manifold plate 62 includes a second inlet 78 therein in communication with an outlet 80 from the exhaust manifold 18 to direct exhaust flow therefrom through a second branch 81 of the exhaust crossover passage 76. The branches 77, 81 of the crossover passage 76 are joined to a central outlet opening 82 which is connected to one end of a third exhaust pipe 84 having the opposite end thereof connected at 86 to the common outlet pipe 32 downstream of the thermostatically controlled heat riser valve 30.

Figure 3:
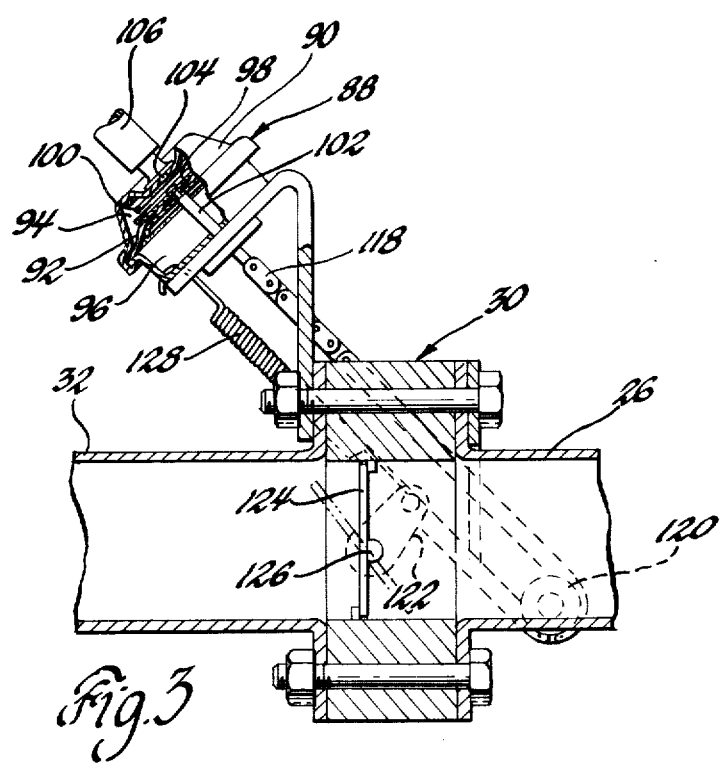
FIG. 3 is a sectional view taken along the line 3—3 of FIG. 1.

Referring now to FIG. 3, the valve 30 is shown in cross section as including a vacuum actuator 88 having a housing 90 with a diaphragm 92 therein separating the housing 90 into a vacuum chamber 94 and a chamber 96 in communication with atmosphere. The diaphragm 92 has a piston 98 connected thereto biased by a spring 100 to bias a piston rod 102 outwardly of the atmospheric chamber 96. A vacuum port 104 to the vacuum chamber 94 is connected by means of a vacuum line 106 to the outlet 108 of a thermal vacuum switch 110 having a thermal sensor 112 thereof sensing the temperature of engine coolant in a passage 114. Switch 110 is more specifically set forth in copending United States application Ser. No. 394188, filed 9/4/73 by William D. Bond and Bruce E. Zemke for Quick Warm-Up Intake Manifold, Office No. A-15,638.

When the coolant temperature is below a predetermined level, it reflects cold engine start conditions and the switch 110 communicates intake manifold pressure at 116 with the vacuum line 106 thereby to reduce the pressure within chamber 94 to cause the piston rod 102 to move inwardly of the housing 90. This pulls a chain 118 connected thereto about a pulley 120 so as to position a heat valve actuating lever 122 to move a valve plate 124 to a closed position thereby to block flow from the separate tailpipes 22, 26 through the common outlet pipe 32. Exhaust from all eight cylinders is thereby directed through the crossover passage 76 and the third pipe 84 to produce rapid warm-up of insert 60. The insert 60 thus will act as a hot spot to evaporate fuel droplets accumulated thereon during cold engine starts.

The heat valve plate 124 has the shaft 126 thereof offset with respect to the centerline of the heat valve and the lever 122 is connected to a spring 128 operative to shift the heat valve plate 124 into an open position when vacuum is reduced in the chamber 94, for example, under full throttle conditions. At the same time, pressure will increase in the exhaust manifolds 16, 18 and will act on the area of the valve plate 124 to cause it to be biased about the offset shaft 126. This and the return action of the spring 128 will quickly move the valve plate 124 to an open position at full throttle operation to open the separate exhaust pipes 22, 26 to the single outlet pipe 32. As a result, high volume exhaust flow at full throttle will flow directly through the outlet 32 rather than through the more restricted crossover passage 76 thereby to prevent excessive pressure losses in the exhaust system.

When the engine is warm, the thermal sensor 114 responds to coolant temperature to condition thermal vacuum switch 110 to communicate line 106 with atmosphere through an atmospheric inlet 130 on switch 110. This reduces vacuum in chamber 94 and spring 100 biases piston rod 102 outwardly of housing 90. Spring 128 then rotates lever 122 counterclockwise as viewed in FIG. 3 to open plate 124 to bypass exhaust flow from crossover passage 76 and cause it to flow directly through pipes 22, 26 and the pipe 32. As a result, the heated insert 60 will be maintained at a reduced temperature to avoid excessive heating of the air-fuel mixture from the carburetor riser bores 38, 40 under warm engine operation.

While the embodiments of the present invention, as herein disclosed, constitute a preferred form, it is to be understood that other forms might be adopted.

What is claimed is as follows:

1. In a heated manifold for a V-8 internal combustion engine of the type having first and second banks of cylinders each with an exhaust manifold, and an intake manifold having riser bores therein and an induction passage for supplying air-fuel mixture to intake valves the improvement comprising: a first pair of transverse runners supplying air-fuel mixture to cylinders in the first bank of cylinders, a second pair of transverse runners supplying air-fuel mixture to cylinders in the second bank of cylinders, an insert plate in the intake manifold located below the riser bores for collecting fuel droplets during engine start, a manifold crossover plate connected to the underside of the intake manifold having a crossover passage with first and second inlets thereto, means for communicating each of said inlets with the exhaust manifold of one of the cylinder banks, said crossover plate including an outlet thereon in communication with said crossover passage between said first and second inlets thereto at a point between said first and second pairs of transverse runners, a Y-configured exhaust pipe having first and second branches each having an inlet connected to the exhaust manifold of the first and second banks of cylinders, respectively, means including an outlet pipe for combining the flow from each of said first and second branches into a single exhaust stream, thermally responsive valve means in said outlet pipe downstream of each of said first and second branches, a second exhaust pipe connected between said crossover plate outlet and the outlet pipe downstream of said valve means at a point between and underlying said first and second pairs of transverse runners, for defining a flow path for exhaust heat from the crossover passageway, said thermally responsive valve means being operative during cold engine start to block flow through said separate exhaust branches and divert exhaust flow through said first and second inlets, said crossover passage and said crossover plate outlet for directing exhaust from eight cylinders against said insert plate to quickly increase the temperature of the insert plate for evaporating fuel droplets collected thereon during cold engine start.

2. In a heated manifold assembly for a V-8 engine including first and second banks of cylinders each having an exhaust manifold the engine including an intake manifold having riser bores therein and an induction passage for supplying air-fuel mixture to intake valves of the engine, the improvement comprising: means forming a single level insert plate located within said intake manifold below said riser bores for collecting fuel droplets during engine start, first and second pairs of transverse runners for supplying air-fuel mixture from said plate to the first and second banks of cylinders, respectively, a manifold plate connected to the underside of the intake manifold having a crossover passage therein with first and second inlets each being in communication with one of the exhaust manifolds of the engine, said crossover plate including an outlet thereon in communication with the crossover passageway, a Y-configured exhaust pipe having first and second branches each having an inlet connected to the exhaust manifold of the first and second banks of cylinders, respectively, said Y-configured exhaust pipe including a single outlet pipe in communication with each of said first and second branches, a valve in the single outlet pipe downstream of said first and second branches, a second exhaust pipe connected between said crossover plate outlet and said single outlet pipe downstream of said valve, said valve including a valve plate therein, shaft means supporting said plate within the outlet pipe for pivotal movement with respect thereto, said shaft being located off-center of said plate, spring means to bias said valve into an open position, vacuum operator means for closing said valve in response to intake manifold pressure in the engine, means for selectively directing the intake manifold to the valve under cold engine start conditions to close said valve to block exhaust flow through said first and second exhaust branches and divert it through the intakes to said crossover passageway thence through the outlet in said manifold crossover plate and said second exhaust pipe for producing unrestricted flow of full eight cylinder exhaust against the underside of said insert plate to cause the temperature thereof to quickly increase during cold engine starts for evaporating fuel droplets collected thereon, said vacuum operator means being responsive to a reduction in engine vacuum at full throttle and said plate being responsive to an increase in exhaust pressure produced by full throttle operation to produce valve opening so as to open communications between said first and second exhaust branches and the single outlet pipe under full throttle conditions thereby to prevent excessive back pressure buildup in the crossover passage during cold start, full throttle operating conditions.

* * * * *